(No Model.)

J. P. HILL.
BALL THROWING DEVICE.

No. 491,558. Patented Feb. 14, 1893.

Witnesses.
Arthur J. Sangster
Jennie M. Caldwell

Julian P. Hill Inventor.
By James Sangster
Attorney.

UNITED STATES PATENT OFFICE.

JULIAN P. HILL, OF BUFFALO, NEW YORK.

BALL-THROWING DEVICE.

SPECIFICATION forming part of Letters Patent No. 491,558, dated February 14, 1893.

Application filed February 17, 1892. Serial No. 421,848. (No model.)

*To all whom it may concern:*

Be it known that I, JULIAN P. HILL, a citizen of the United States, residing at Buffalo, in the county of Erie and State of New York, have invented certain new and useful Improvements in Devices for Throwing Balls, of which the following is a specification.

My invention relates to a new and improved device for throwing balls, and will be fully and clearly hereinafter described and claimed reference being had to the accompanying drawings, in which—

Figure 1:
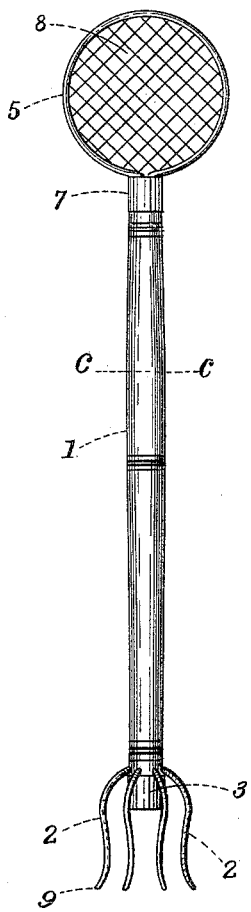
Figure 3:
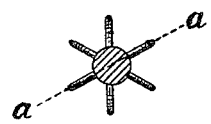
Figure 2:
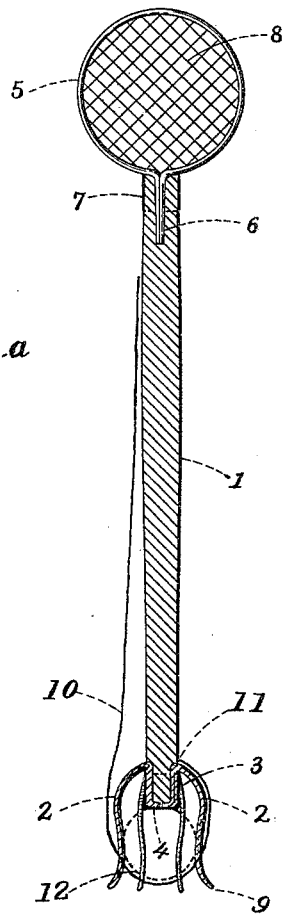

Figure 1 is a side elevation of the device complete. Fig. 2 is a longitudinal section through line $a\ a$, Fig. 3. Fig. 3 is a cross section on or about on line $c\ c$, Fig. 1, looking down toward the fork.

Referring to said drawings—the handle, 1, is preferably made of hard wood as being the cheapest and best material that can be used, but any suitable material may be employed. At one end of the handle is a series of spring fork tines, 2. They are rigidly secured to the handle by being bent so as to pass into the handle and down inside of the ferrule, 3, and then the ends, 4, are bent over the end of the handle so that their points meet or substantially meet as shown in Fig. 2. The ferrule, 3, being driven tightly on the handle holds everything rigid. At the opposite end of the handle is a wire ring, 5, bent so that the two ends form a shank, 6, which is driven into the end of the handle and is further secured by means of a ferrule, 7. On this ring, 5, is secured a netting, 8, of any suitable well known material. The object of this netting is to provide a suitable means for catching or striking the ball, but this netting may, if desired, be dispensed with.

This invention is designed as an easy means with which children may play ball. The ball is picked up by pressing the tines of the fork down over it and may then be thrown to a comparatively great distance. It will be noticed that the tines, 2, are curved outward at the ends, 9, so that they pass easily over the ball when forced down over it and the spring tines clasp over and hold it securely until thrown out. A string or cord, 10, is secured to the end of the handle at or about the point, 11, shown in Fig. 2 and drawn up over the ball and held by the hand until it is desired to let the ball go. This construction enables the operator by a little practice to give the greatest force possible to the ball when throwing it.

I claim as my invention.

1. A device for throwing balls, consisting of a handle, 1, a series of spring fork tines, 2, having their lower ends curved outward so as to adapt them for catching over and clasping a ball, and a cord, 10, for holding the ball until it is desired to let it go, substantially as and for the purposes described.

2. A device for throwing balls, consisting of a handle, 1, having a series of spring forks, 2, secured thereto by having the ends bent so as to pass down inside of the ferrule 3, and the ends 4 bent over the end of the handle so that their points meet, substantially as described.

JULIAN P. HILL.

Witnesses:
 JAMES SANGSTER,
 ARTHUR J. SANGSTER.